Feb. 21, 1928.

L. M. PEARCE 1,659,783

PIPE HOLDING SLIP

Filed Nov. 6, 1925

Inventor
Louis M. Pearce

Hardway Cathey
Attorneys

Patented Feb. 21, 1928.

1,659,783

UNITED STATES PATENT OFFICE.

LOUIS M. PEARCE, OF HOUSTON, TEXAS, ASSIGNOR TO TEXAS IRON WORKS SALES CORPORATION, OF HOUSTON, TEXAS, A CORPORATION OF TEXAS.

PIPE-HOLDING SLIP.

Application filed November 6, 1925. Serial No. 67,355.

This invention relates to new and useful improvements in a pipe holding slip.

One object of the invention is to provide a slip of the character described which will securely grip and hold a pipe, or tubing suspended in a well bore and which will readily release the pipe when the latter is elevated through the supporting rotary table or supporting spider from which the pipe is suspended.

Another object of the invention is to provide a slip, of the character described which will securely grip and hold the pipe, or tubing, without cutting, crushing, or injuring the same.

Pipe holding slips, as at present constructed, are formed to wedge in between the rotary spider, or tubing spider, and the pipe to be held and the outside pitch of the slips is such as to cause them to wedge so tightly, when subjected to the weight of the pipe that when the pipe is pulled upwardly the slips will not release but will carry the spider or rotary table up with the pipe. If such slips are given a less outside pitch to cause them to release they will not securely grip the pipe. Furthermore the conventional type of slip has inside teeth to engage the pipe to prevent its slipping through the slips and these teeth often bite into and weaken the pipe to such an extent that it twists off in the bore when subjected to torsional strain in drilling.

The slip herein described has been specially designed so that it will securely grip and hold the pipe and will readily release itself from the spider so that it will not stick in the spider or the rotary table, upon upward movement of said pipe; its construction being such that it will not bite into, crush or injure the pipe being held by it.

A further feature of the invention resides in the provision of a pipe holding slip embodying novel means for applying it to, and removing it from the pipe or tubing.

With the above and other objects in view this invention has particular relation to certain novel features of construction, operation and arrangement of parts, an example of which is given in this specification and illustrated in the accompanying drawings, wherein:—

Figure 1:
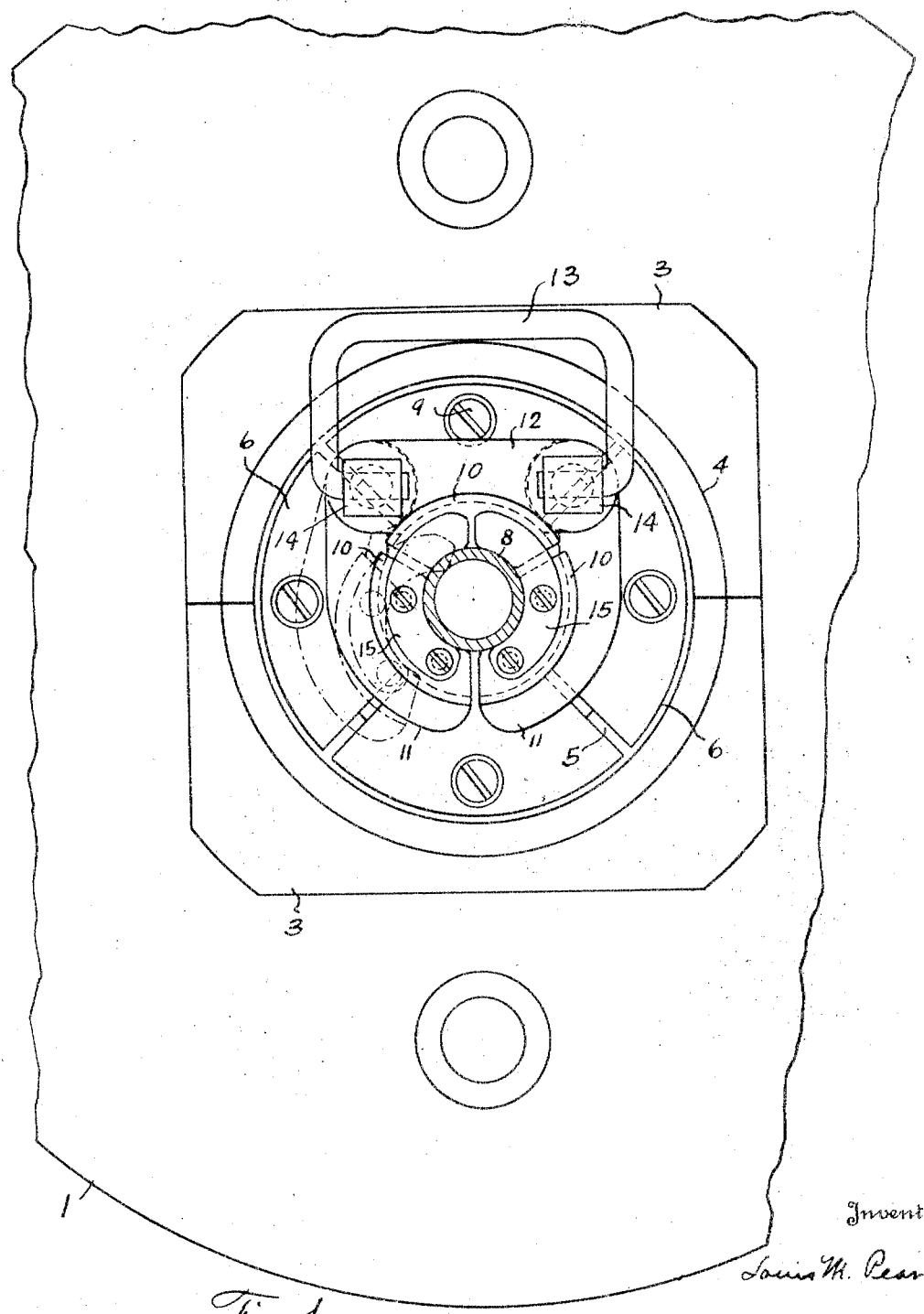
Figure 1 shows a fragmentary plan view of a rotary drilling machine with the slips in pipe holding position therein.

Referring now more particularly to the drawings, wherein like numerals of reference designate similar parts in each of the figures the numeral 1 designates a rotary table of conventional form, having a central, vertical pipe receiving opening 2, and the conventional, sectional adapter ring 3 therein, surrounding said opening. Within the adapter ring there is a sectional spider 4, preferably formed of sections also. At its upper end the spider is counter sunk on its inside forming an annular supporting shoulder 5. Seated in the spider there is a slip ring, preferably composed of a plurality of sections, as 6, each section having an external flange 7, at its upper end, adapted to seat on the shoulder 5. The sections 6 are arcuate in horizontal cross sectional contour, and their outer sides, beneath the flanges 7, have a pitch, or taper, downwardly and inwardly, so as to conform to the taper of, and to fit snugly within a correspondingly tapered seat in the spider 4, said taper being such that the sections of the slip ring will not wedge or stick in the spider when the suspended pipe 8 is moved upwardly. The sections of the slip ring are attached to the spider by means of set bolts 9 which are fitted loosely through suitable bearings in the flanges 7 of the respective sections and screwed into the shoulder 5 beneath, with their heads counter sunk into said flanges, there being sufficient clearance between said heads and flanges to permit a limited vertical movement of the slip ring, relative to said spider.

Slip wedges 10, are provided. These wedges are arcuate in horizontal cross-sectional contour and their inner faces are preferably smooth and conform to the contour of and fit around the pipe 8, to be held. Three, or more, of these slip wedges will be employed in each complete pipe holding slip. The outer sides of these slip wedges, as also the inner sides of the sections of the slip ring have a very decided downward and inward taper or pitch so that they will wedge tightly between the slip ring and pipe and securely hold the pipe suspended from the spider. As stated these wedges are preferably not toothed so that they will not injure the pipe.

The slip wedges 10 are anchored, one to each of the swinging arms 11, 11 and the other to the cross link 12 to the ends of which the respective arms 11 are pivoted. The wedges 10 may be secured to said arms and link in any approved manner as, for example, by welding.

Figure 2:
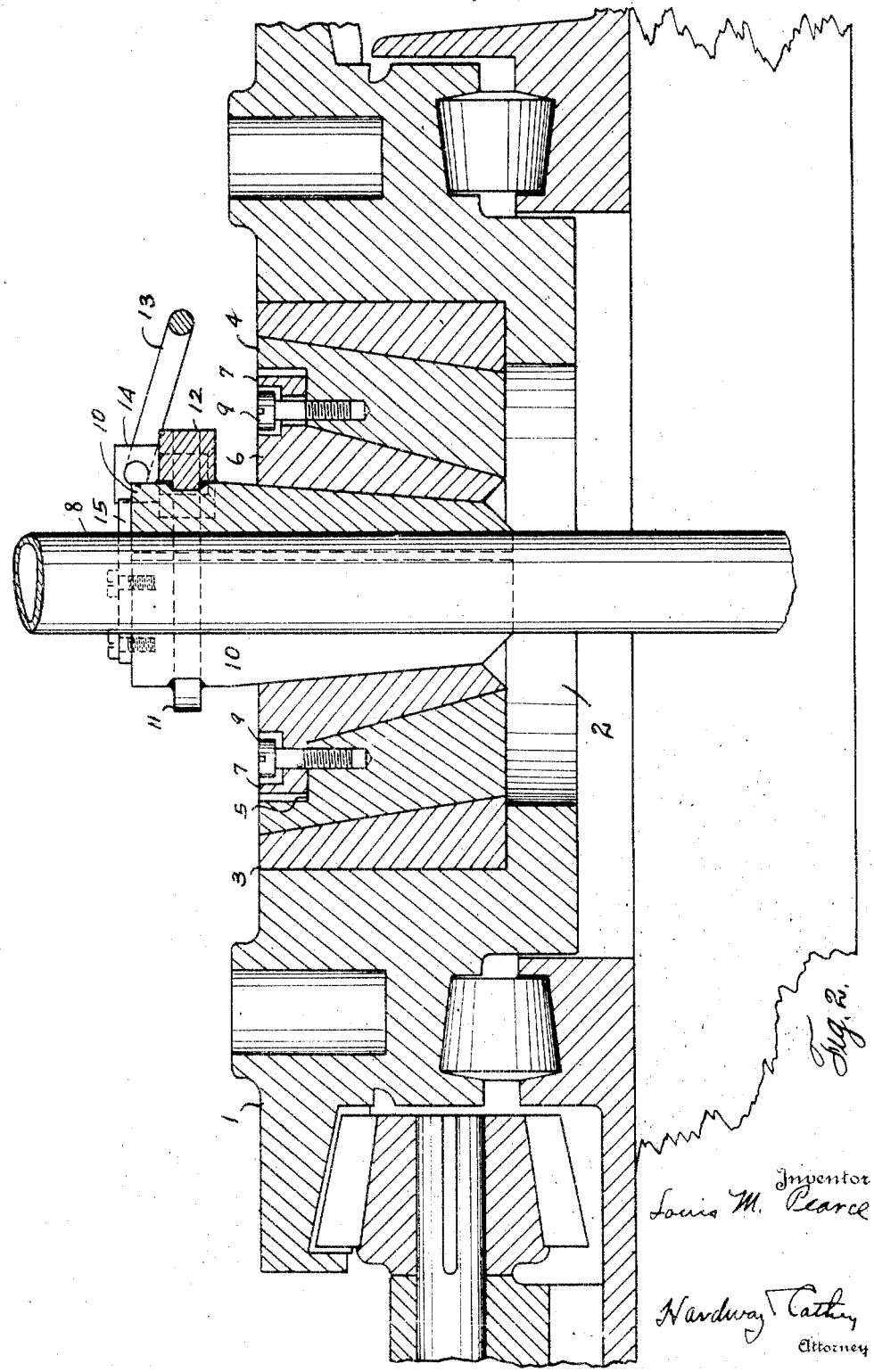
Figure 2 shows a vertical sectional view thereof.
Figure 4:
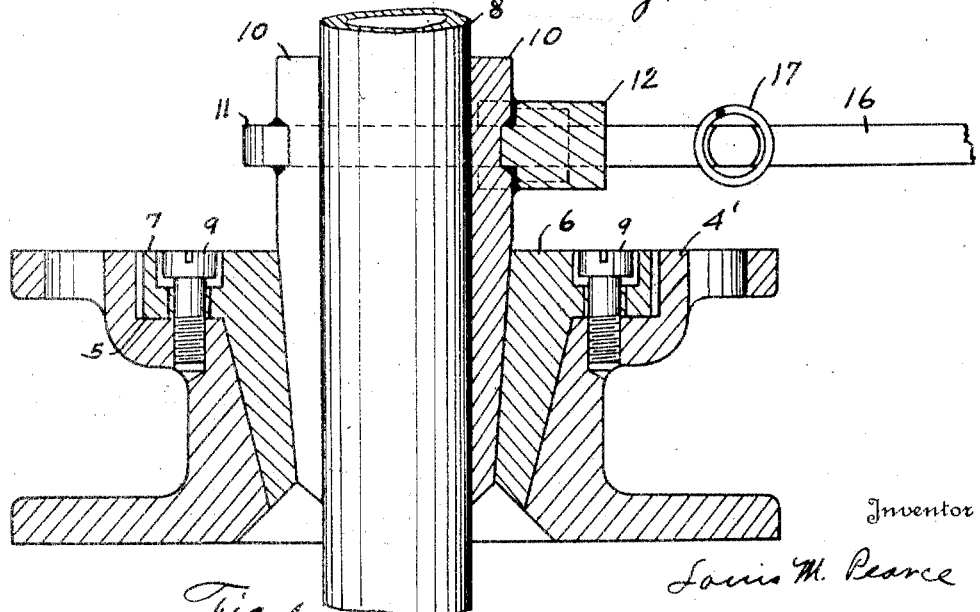
Figure 4 shows a vertical section view thereof.

The foregoing description of the complete slip applies to the two different types shown, the tubing spider 4', shown in Figure 4, in which the tubing slip is shown mounted, being of a different design from the rotary spider 4, shown in Figures 1 and 2, in which the pipe holding slip adapted to sustain heavier pipe, is mounted.

In the type shown in Figures 1 and 2 there is a bail 13 whose ends are inwardly turned and have bearings in the upwardly extended ends of the pintles 14, 14, which connect the arms 11 to the cross link 12. In this type there are arcuate straps 15, 15, fastened to the upper ends of the slip wedges 10, with their inner ends projecting beyond said wedges so that when the wedges are swung open, away from the pipe these projecting ends will swing inwardly, as shown in dotted lines in Figure 1 to the end that when the slip wedges are again applied to the pipe these projecting ends of the straps will engage against the pipe and swing the side slips 10 in engaging position around the pipe.

Figure 3:
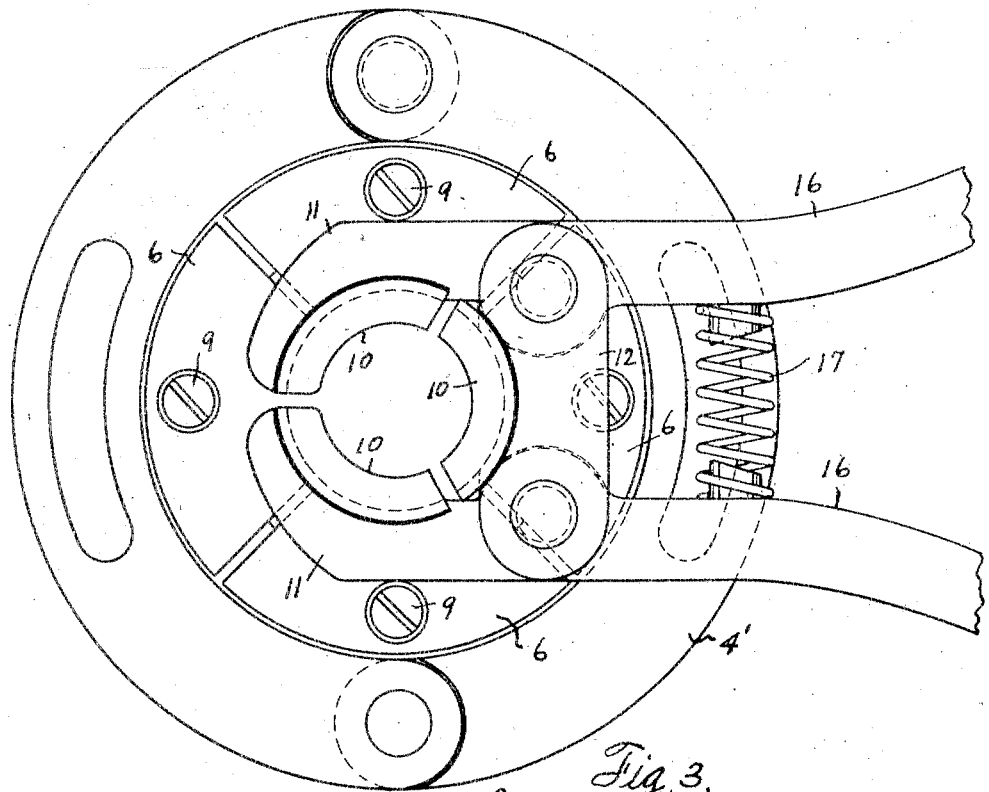
Figure 3 shows a plan view of a tubing spider with the slips in pipe holding position therein.

In the type shown in Figures 3 and 4 the arms 11 are extended forming the handles 16, 16, with the pressure spring 17 interposed between them. When the slip wedges are to be removed from the pipe, said wedges may be elevated out of the slip ring 6, the handles may then be moved toward each other operating on the cross link 12 to open the slip wedges and release the pipe. When it is desired to apply the slip wedges to the pipe they may be opened, as explained, and applied to the pipe and the handles, then released and the spring 17 will operate to close the slip wedges about the pipe.

When the pipe holding slip is in position about the pipe or tubing, and such pipe is released the slip wedges 10 will seat in the slip ring 6, which will in turn seat in the spider. The slip wedges will wedge tightly between the slip ring and pipe and securely hold said pipe, without injury to it by reason of the fact that the inner side of said wedges are smooth.

When it is desired to release the pipe holding slip the pipe 8 may be pulled upwardly and the slip ring 6 will readily lift up, or unseat from the spider and their grip about the slip wedges will be thereby relaxed and said wedges will then readily unseat from said slip ring.

What I claim is:—

1. A pipe holding slip including a sectional slip ring having an internal downwardly converging seat, a plurality of slip wedges adapted to fit into said seat around the pipe to be held, a cross link to which one of said slip wedges is secured, arms pivoted to the respective ends of the cross link and to which the other slip wedges are secured.

2. A pipe holding slip including a sectional slip ring having an internal downwardly converging seat, a plurality of slip wedges adapted to fit into said seat around the pipe to be held, a cross link to which one of said slip wedges is secured, arms pivoted to the respective ends of the cross link and to which the other slip wedges are secured, said arms being extended forming handles.

3. A pipe holding slip including a sectional slip ring having an internal downwardly converging seat, a plurality of slip wedges adapted to fit into said seat around the pipe to be held, a cross link to which one of said slip wedges is secured, arms pivoted to the respective ends of the cross links and to which the other slip wedges are secured, said arms being extended forming handles and a yieldable member between the handles.

4. The combination with a spider having an internal, downwardly converging seat, a sectional slip ring having an external downwardly converging seat adapted to fit within said spider seat, said slip ring also having an internal downwardly converging seat having a greater pitch than the pitch of the external slip ring seat, means loosely connecting the sections of said ring to said spider, means preventing the complete separation of said sections from the spider, a plurality of slip wedges arcuate in horizontal cross sectional contour, and whose outer faces taper downwardly and are thus adapted to conform to the contour of said internal slip ring seat and to wedge between it and the pipe to be held.

5. The combination with a spider having an internal downwardly converging seat, a sectional slip ring having an external downwardly converging seat adapted to fit within said spider seat, said slip ring also having an internal downwardly converging seat having a greater pitch than the pitch of the external slip ring seat, means loosely connecting the sections of said ring to said spider, means preventing the complete separation of said sections from the spider, a plurality of slip wedges arcuate in horizontal cross sectional contour and whose outer faces taper downwardly and are thus adapted to conform to the contour of said internal slip ring seat and to wedge between it and the pipe to be held and whose inner faces are smooth.

6. The combination with a spider, having an internal downwardly converging seat, a sectional slip ring having an external downwardly converging seat adapted to fit within said spider, said slip ring also having an internal downwardly converging seat having a greater pitch than the pitch of the external slip ring, seat interengaging means loosely connecting the sections of said ring to said spider, means preventing the complete separation of said sections from the spider, a plurality of slip wedges arcuate in horizontal cross sectional contour and whose outer faces taper downwardly and are thus adapted to conform to the contour of said internal slip ring seat and to wedge between it and the pipe to be held and to surround said pipe and means for simultaneously manipulating said wedges.

7. The combination of a string of pipe, a spider having an internal downwardly converging seat, a slip ring having an external downwardly converging seat adapted to fit within said spider seat, said slip ring also having an internal downwardly converging seat having a greater pitch than the pitch of said spider seat, said slip ring being formed of sections, means uniting the slip ring sections to the spider, said means permitting a limited movement of said sections relative to said spider, means preventing the complete separation of said sections from the spider, a plurality of slip wedges arcuate in cross sectional contour and whose outer faces taper downwardly and conform to the contour of said internal slip ring seat, the inner faces of said wedges having smooth bearing surfaces which frictionally engage the pipe to be held, and which are forced into frictional engagement with the pipe solely by said external seat and which sustain said pipe solely by friction.

8. In a device of the character described, a spider having an external downwardly converging seat, and an internal seat which converges downwardly, a slip ring having an external downwardly converging seat adapted to fit within and seat against the internal spider seat, means anchoring the slip ring to the spider, said anchoring means permitting only a limited vertical movement of the slip ring relative to the spider, said slip ring being formed of sections and having an internal smooth downwardly converging seat having a greater pitch than the external seat thereof and adapted to receive a slip.

In testimony whereof I have signed my name to this specification.

LOUIS M. PEARCE.